United States Patent
Miyake et al.

(12) 
(10) Patent No.: US 6,178,836 B1
(45) Date of Patent: Jan. 30, 2001

(54) POSITIONING APPARATUS

(75) Inventors: Toru Miyake, Iwata; Manabu Okada, Hamamatsu, both of (JP)

(73) Assignee: NTN Corporation, Osaka (JP)

(*) Notice: Under 35 U.S.C. 154(b), the term of this patent shall be extended for 0 days.

(21) Appl. No.: 09/172,136

(22) Filed: Oct. 14, 1998

(30) Foreign Application Priority Data

Oct. 31, 1997 (JP) ................................... 9-300887

(51) Int. Cl.⁷ .................................................. F16H 19/02
(52) U.S. Cl. .................................. 74/89; 476/64; 476/67
(58) Field of Search ................................. 74/25, 89, 20; 476/64, 67, 6, 7

(56) References Cited

U.S. PATENT DOCUMENTS

| | | | |
|---|---|---|---|
| 1,399,329 | * 12/1921 | Vandercook | 476/72 |
| 1,658,458 | * 2/1928 | Mross | 476/64 |
| 2,204,638 | * 6/1940 | Weathers | 74/25 |
| 3,272,021 | * 9/1966 | Weber | 74/25 |
| 3,475,972 | * 11/1969 | Steibel | 74/25 |
| 4,043,927 | * 8/1977 | Duling et al. | 476/7 |
| 4,191,059 | * 3/1980 | Vanslette | 74/25 |
| 4,411,166 | 10/1983 | Marcovici . | |
| 4,947,698 | 8/1990 | Dodds et al. . | |
| 5,511,438 | 4/1996 | Aki . | |
| 5,669,600 | * 9/1997 | Okada | 269/73 |

FOREIGN PATENT DOCUMENTS

| | | |
|---|---|---|
| 0 001 007 | 3/1979 | (EP) . |
| 2006387 | 5/1979 | (GB) . |
| 8-184360 | * 7/1996 | (JP) . |
| 760443 | 10/1956 | (NL) . |

* cited by examiner

*Primary Examiner*—David A. Bucci
*Assistant Examiner*—William C Joyce
(74) *Attorney, Agent, or Firm*—Sughrue, Mion, Zinn, Macpeak & Seas, PLLC

(57) ABSTRACT

A positioning apparatus includes a machine bench 1, an external pressure linear bearing assembly 2 and a slide body 3 mounted on the machine bench 1 through the bearing assembly 2 for reciprocating movement relative to the machine bench. The positioning apparatus has a frictional reciprocating drive mechanism 4 for reciprocatingly driving the slide body 3 which is provided and includes a main shaft 5 adapted to be rotated, and a plurality of rollers 9 disposed around the main shaft 5 and inclined at a predetermined angle relative to the main shaft 5. Each roller 9 is pressed relative to the main shaft 5 by a pressing member 15. The slide 3 and a rail 20 are made of ceramics. Magnets 41 are provided on the slide body 3 for developing forces of magnetic attraction between magnetizable members 42, provided on the machine bench 1, and the slide body 3.

9 Claims, 3 Drawing Sheets

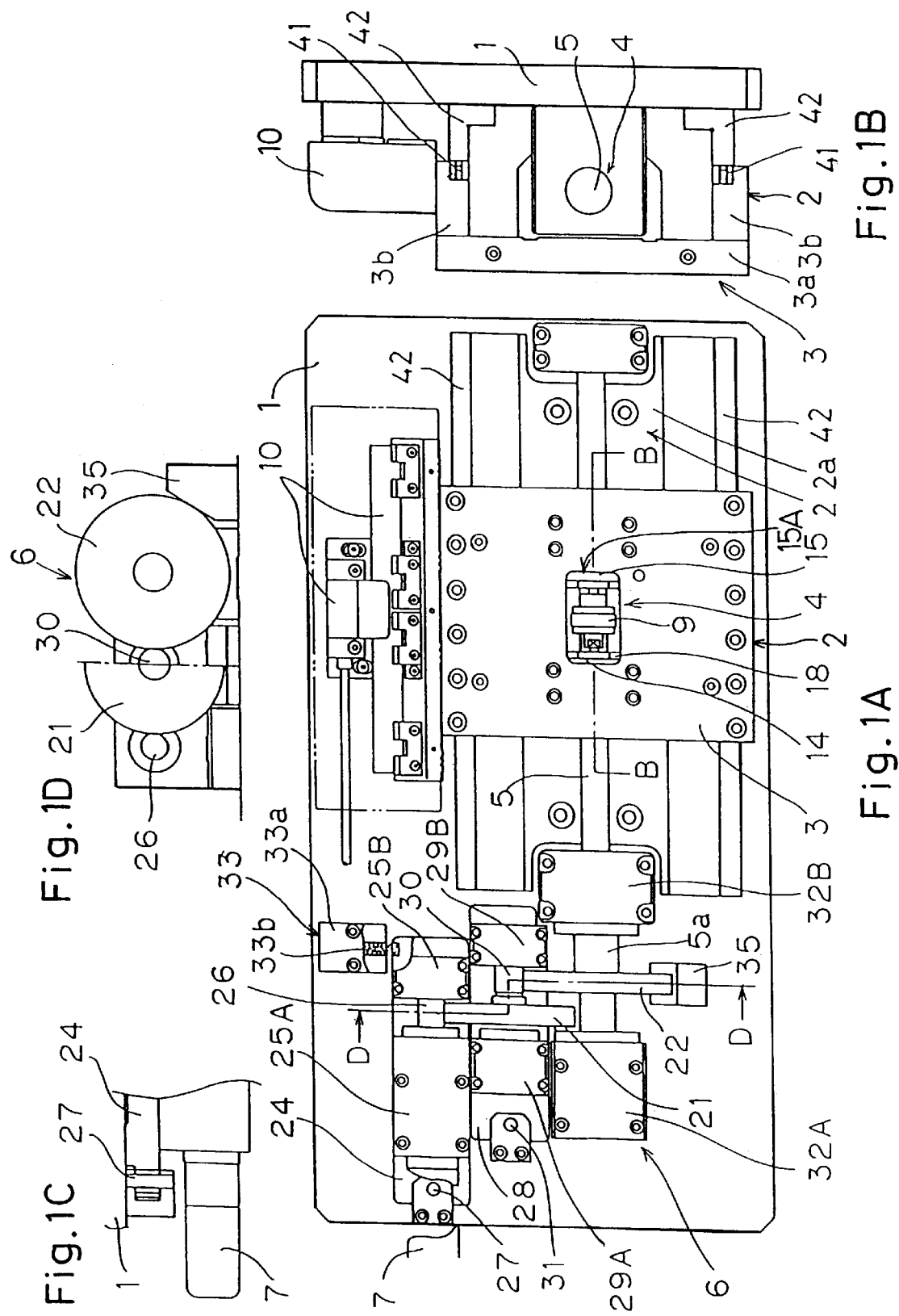

POSITIONING APPARATUS

BACKGROUND OF THE INVENTION

1. Field of the Invention

The present invention relates to a positioning apparatus for positioning a slide body used in a precision machine such as, for example, an optical disc mastering machine or a semiconductor testing machine, and a frictional reciprocating drive mechanism used for reciprocatingly driving the slide body.

2. Description of the Prior Art

In a machine such as, for example, an optical disc mastering machine or a semiconductor testing machine, which requires a high precision, a pneumatic slide device in which a slide body is installed for reciprocating movement through an externally pressurized linear bearing assembly has hitherto been employed largely. For driving the slide body, a linear motor of a voice-coil type is generally employed and a closed loop control system is employed in which an interference laser measuring instrument or a linear scale is employed for a position detector. Also, in an apparatus such as, for example, the semiconductor testing machine, in which after having been positioned the slide body is required to be held in a static condition in order for a work to be observed, a ball screw is largely employed for driving the slide body.

It has, however, been found that the slide device utilizing the linear motor of the voice-coil type is of a completely non-contact design, the slide device tends to be adversely affected by an external disturbance. For this reason, improvement in resolution has hitherto been limited. On the other hand, the slide device utilizing the ball screw for driving the slide body, the presence of an error in shape of a helical groove and/or diameter of balls tends to result in fluctuation in speed so as to bring about a shaking motion of the slide body in a direction axially of a shaft.

Apart from the above, a frictional reciprocating drive mechanism comprising a main shaft adapted to be rotated and a roller held in a rolling contact with the main shaft and inclined a predetermined angle relative to the main shaft has been suggested as a device effective to accomplish a precise feed. However, even this frictional reciprocating drive mechanism is unable to accomplish a highly accurate drive of the main shaft, failing to achieve a precise positioning of the slide body, because of the presence of an influence brought about by a fluctuated rotation of the motor and/or a phase deviation occurring in a transmission system for transmitting the rotation of the motor to the main shaft.

In addition, the conventional externally pressurized linear bearing assembly has been found difficult to secure a sufficient rigidity of the bearing assembly and the lack of a sufficient rigidity tends to adversely affect the accuracy of positioning.

The apparatus in which the pneumatic slide device having the linear motor of the voice-coil type discussed above is utilized, or the apparatus in which the ball screw is utilized to drive the slide body, inherently involve a factor such as, for example, a yawing that tends to reduce the accuracy and, therefore, a highly accurate positioning is difficult to achieve.

Yet, since the accuracy of positioning is limited because of fluctuation in speed of movement of the slide body, a high density write-in is difficult to achieve where the pneumatic slide device is utilized.

SUMMARY OF THE INVENTION

Accordingly, the present invention has been devised with a view to substantially eliminating the above discussed problems inherent in the prior art apparatuses and is intended to provide an improved frictional reciprocating drive mechanism including a main shaft and a plurality of rollers rollingly contacting the main shaft while oriented at a predetermined angle relative to the main shaft, wherein influence which would be brought about by a fluctuation of rotation of a rotatory drive source is minimized along with minimization of the phase deviation in the rotary drive transmission system to accomplish a highly accurate positioning.

Another important object of the present invention is to provide an improved positioning apparatus, which is less susceptible to deviation in speed to accomplish a stabilized feed and which is robust against an external disturbance enough to increase the resolution.

A further object of the present invention is to provide an improved positioning apparatus of the type referred to above, wherein the factor, such as a yawing, which leads to reduction in accuracy, is minimized; which is less susceptible to deviation in speed to accomplish a stabilized feed and which is robust against an external disturbance enough to increase the resolution.

In order to accomplish these and other objects of the present invention, the present invention according to one aspect thereof provides a frictional reciprocating drive mechanism which comprises a main shaft, a roller held in a rolling contact with an outer periphery of the main shaft and inclined at a predetermined angle relative to the main shaft, a slide body movable together with the roller that is moved as a result of rotation of the main shaft, a source of rotation for rotating the main shaft, and a reduction gear unit for transmitting the rotation of the source of rotation from a drive-side shaft to a friction wheel to thereby transmit the rotation of the source of rotation at a reduced speed to the main shaft.

According to the present invention, by rotating the main shaft, the roller rotates about the associated roller spindle in a direction substantially counter to the direction of rotation of the main shaft while oriented at a lead angle that is equal to the angle of inclination of the roller, accompanied by a frictional force developed between the roller and the main shaft. By those forces of friction between the roller and the main shaft, the slide body is driven axially of the main shaft. In such case, since the rotation of the rotatory drive source is transmitted to the main shaft after having been reduced in speed, any possible influence which would be brought about by fluctuation in rotation of the rotatory drive source on the accuracy of positioning of the slide body can be minimized. Also, transmission and reduction in speed of the rotation of the rotatory drive source are accomplished through the frictional contact between the drive-side shaft and the friction wheel and, therefore, no backlash occur, resulting in a highly accurate positioning of the slide body.

The frictional reciprocating drive mechanism of the structure described above may further comprises a displacement permitting support means for displaceably supporting the drive-side shaft so as to displace in a direction close towards and away from the friction wheel, and a pressure applying means for resiliently urging the drive-side shaft towards the friction wheel.

Application of the pressure to the drive-side shaft so as to urge the latter towards the friction wheel is effective to attain a stabilized frictional contact while absorbing an error in a direction radially of the friction wheel position, to thereby attain a further stabilized rotatory drive transmission.

Also, in this frictional reciprocating drive mechanism, a solid lubricant contacting an outer peripheral face of the friction wheel may be utilized so that a predetermined quantity of lubricant can be supplied to respective friction areas to accomplish a stabilized rotation for a substantially long period of time to secure a further stabilized operation. Accordingly, a further accurate positioning is possible. Also, since the solid lubricant is used, the possibility of fluctuation in rotation which would result from the intervention of a lubricant can be prevented unlike the standard grease.

In this frictional reciprocating drive mechanism, said roller is rotatably mounted on an outer periphery of a roller spindle through a circumferential row of rolling elements and the roller spindle is sandwiched from an axial direction between a fixed support and a pressing member both provided on the slide body. The fixed support and the pressing member include a spindle retaining means for regulating positions of opposite ends of the roller spindle with respect to the axial direction, while the pressing member is displaceable in directions axially of and transverse to the main shaft. The pressure applying means is constituted by the pressing member and a resilient element.

With this structure, since the pressing member has a freedom of movement or deflection in a direction vertical to an axial direction, any possible misalignment between a guide means for the slide body and the main shaft can be absorbed if such guide means for the slide body is utilized. For this reason, the straightness depends on the precision of the slide body guide means and in turn the linearity of the path of movement of the slide body is increased. Since the roller is rotatably supported on the roller spindle through the rolling contact elements, the load torque acting on the roller is small. Also, since the opposite ends of the roller spindle are regulated in position by the spindle retaining means, a stabilized operation can be obtained.

The present invention according to another aspect thereof also provides a positioning apparatus which comprises a slide body mounted on a machine bench for reciprocating movement between advanced and retracted positions, and a frictional reciprocating drive mechanism provided in the slide body for reciprocately driving the side body and further for supporting between the slide body and the machine bench by an external pressure. The frictional reciprocating drive mechanism comprises a main shaft, a plurality of rollers disposed around the main shaft and held in a rolling contact with an outer periphery of the main shaft, and a pressure applying means for applying a pressure to each of the rollers relative to the main shaft. Each of the rollers is inclined at a predetermined angle relative to the main shaft.

With this positioning apparatus, the slide body can be reciprocatingly driven and positioned by the frictional reciprocating drive mechanism while supported ported on the machine bench by means of an external pressure. Since each of the rollers is given a pressure relative to the main shaft by the pressure applying means, the respective roller can contact the main shaft in a stabilized fashion. The frictional reciprocating drive mechanism referred to above is composed of the main shaft and the roller, and since the component parts are of a simplified shape, they can easily be machined to a high precision and, unlike the ball screw, there is no possibility that the presence of an error in shape of a helical groove and/or diameter of balls may result in fluctuation in speed, to thereby accomplish a stabilized feed.

Since the positioning apparatus of the structure discussed above is of a design utilizing the frictional reciprocating drive mechanism in combination with the support by the external pressure, the slide body can be highly accurately guided by the support by the external pressure and, also, the since the slide body is mechanically supported by the contact between the main shaft and the rollers with respect to the direction of movement thereof, the positioning apparatus is robust against the external disturbance, as compared with a completely non-contact type positioning apparatus, to thereby compensate for a demerit of the support by the external pressure Also, a stabilized feed is possible without accompanying fluctuation in speed such as discussed hereinbefore. For these reasons, increase of the resolution is possible.

In the positioning apparatus of the structure described above, each of the rollers is preferably rotatably mounted on an outer periphery of a roller spindle through a circumferential row of rolling elements, while the roller spindle for each roller is sandwiched from an axial direction between a fixed support and a pressing member both provided on the slide body. In this case, the fixed support and the pressing member include a spindle retaining means for regulating positions of opposite ends of the respective roller with respect to the axial direction, said pressing member being displaceable in directions axially of and transverse to the main shaft. The pressure applying means is comprised of the pressing member and a resilient member.

In this structure, opposite ends of the roller spindle for each of the rollers are preferably shaped spherically and the spindle retaining means may comprise a pair of frame-like retaining plates disposed in the vicinity of the fixed support and the pressing member, respectively. Each of said frame-like retaining plates is operable to regulate the roller spindles of the plural rollers at respective inner peripheral corner areas thereof. The use of a spherical shape for each of the opposite ends of the roller spindle for each roller is effective to permit the misalignment to be smoothly absorbed. Also, the use of the retainer plates of the design described above is advantageous in that all of the retainer plates can be simultaneously prepared, i.e., machined to thereby minimize an angular error between the neighboring rollers.

Also, in this structure, a solid lubricant may be employed and held in contact with an outer peripheral face of the rollers. The use of the solid lubricant is effective to supply a redetennined quantity of lubricant to friction areas to thereby accomplish a stabilized rotation for a substantially long period of time to secure a further stabilized operation.

In this positioning apparatus, a rail mounted on the machine bench for guiding the slide body and the slide body may be made of ceramics. If the rail and the slide body are made of ceramics, the rigidity of the rail and the slide body can be increased to eliminate any possible reduction in positioning accuracy which would occur if the rigidity is not sufficient. For this reason, by a cumulative effect brought about by the combined use of the frictional reciprocating drive mechanism and the support by the external pressure in which the rail and the slide body made of ceramics are employed, a further highly accurate positioning is possible.

Also, in this positioning apparatus, a magnet means may be mounted on the slide body to magnetically attract the slide body and the machine bench towards each other. In this design, since the support by the external pressure is carried out against the force of magnetic attraction which is developed by the magnet means between the slide body and the machine bench, an excessive flotation of the slide body can advantageously be prevented to allow the slide body to be supported by the external pressure in a further stabilized fashion. Thus, by the combined use of the highly stable support by the external pressure with the aid of the magnet means and the frictional reciprocating drive mechanism, the positioning accuracy can further be increased.

According to a further aspect of the present invention, there is provided a positioning apparatus which comprises a table slidably mounted on a rail, and a frictional reciprocating drive mechanism for slidingly driving the table. The frictional reciprocating drive mechanism comprises a main shaft disposed so as to extend parallel to the rail and adapted to be rotated, and a plurality of rollers disposed around the main shaft and held in contact with the main shaft, each of said rollers being inclined at a predetermined angle relative to the main shaft, and a pressure applying means for applying a pressure to each of the rollers relative to the main shaft. The main shaft is positioned generally intermediate of a width of the table.

With the positioning apparatus of the structure described above, not only can the table be fed in a stabilized fashion, but also since the main shaft is positioned intermediate of the width of the table, a possible causes of reduction in accuracy such as, for example, a yawing can advantageously be minimized, thereby allowing a highly accurate positioning to be accomplished. In addition, since the frictional reciprocating drive device is of a type capable of driving in contact with the main shaft, the positioning apparatus can be robust against the external disturbance accompanied by an increase in resolution even if the guide of the table by the rail is carried out on a non-contact basis.

Preferably, in the positioning apparatus of the structure described above, the table is supported relative to the rail by an external pressure, so that the table can be guided more accurately. In this case, since the reciprocating movement of the table is carried out by the frictional reciprocating drive mechanism, the positioning apparatus robust against the external disturbance and capable of having an increased resolution can be obtained while the guide of the table is carried out by a no contact guidance.

Furthermore, in the positioning apparatus of the structure described above, the plural rollers may be provided at a single location on the table with respect to an axial direction of the main shaft. Where the rollers are provided at the single location, the structure of the frictional reciprocating drive mechanism can be simplified as compared with the case in which they are provided at a plurality of locations. Even though the rollers are arranged at the single location, the development of the cause of reduction in accuracy such as, for example, a yawing can advantageously be minimized since the main shaft is positioned intermediate of the width of the table.

The positioning apparatus of the present invention is for use in the optical disc mastering machine, wherein there is provided a frictional reciprocating drive mechanism for supporting a table relative to a machine bench by an external pressure and for slidingly driving the table relative to the machine bench.

According to this structure, since the support by the external pressure and the frictional reciprocating drive mechanism are combined, a demerit of the support by the external pressure can be compensated for. Also, since the frictional reciprocating drive mechanism is made up of component parts of a simplified shape such as a main shaft made of a round shaft, and rollers held in contact with the main shaft while inclined relative thereto and since such simplified component parts can easily be machined with high precision, a stabilized feed can be accomplished with no fluctuation occurring in speed. For these reasons, the positioning resolution can be increased to accomplish a high density write-in.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1A is a plan view of a positioning apparatus according to a preferred embodiment of the present invention;

FIG. 1B is a side view of the positioning apparatus shown in FIG. 1A;

FIG. 1C is a fragmentary side view, on an enlarged scale, of a motor mounting of the positioning apparatus shown in FIG. 1A;

FIG. 1D is a cross-sectional view taken along the line D—D in FIG. 1A;

DETAILED DESCRIPTION OF THE EMBODIMENT

Figure 3A:
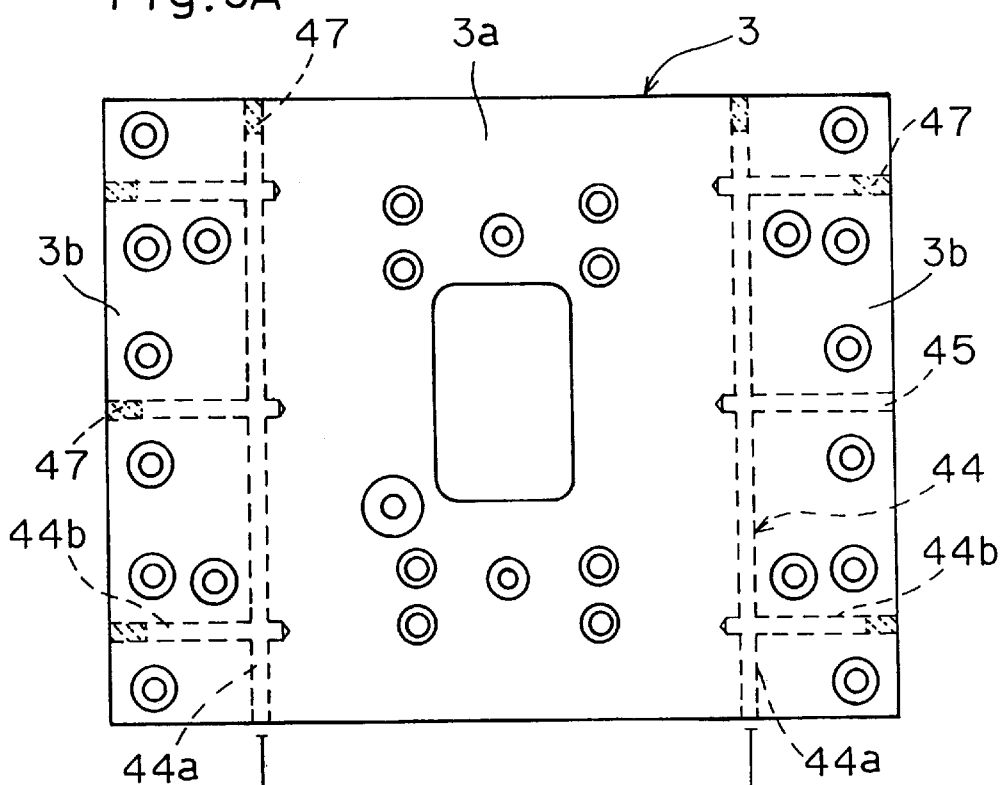
FIG. 3A is a plan view of a slide body employed in the positioning apparatus.
Figure 3B:
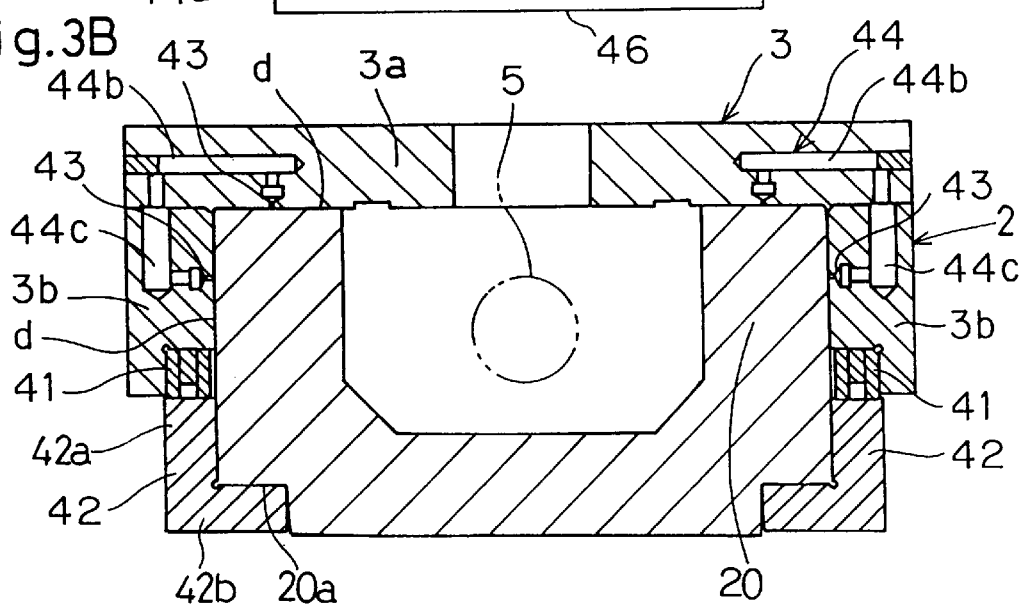
FIG. 3B is a side view of the slide body shown together with a rail.

Reference will now be made to the accompanying drawings for the detailed discussion of the positioning apparatus according to the present invention. As best shown in FIG. 1A, the positioning apparatus includes a slide body 3 serving as a support table and mounted on a machine bench 1 for movement between advanced and retracted positions by means of an externally pressurized linear bearing assembly 2. The positioning apparatus also includes a frictional reciprocating drive mechanism 4 having a main shaft 5 positioned intermediate of the width of the externally pressurized linear bearing assembly 2. The slide body 3 is of a generally saddle-like configuration including, as best shown in FIG. 1B, a generally rectangular top plate 3a and a pair of side plates 3b extending downwardly from respective opposite ends of the top plate 3a so as to lie perpendicular to the top plate 3a. This slide body 3 straddles a guide rail 20 that is accommodated within a space delimited by the top and side plates 3a and 3b. The guide rail 20 is fixedly mounted on the machine bench 1 and serves as an elongated guide along which the slide body 3 is guided during the movement thereof between the advanced and retracted positions. In the illustrated embodiment, the guide rail 20 has a substantial wall thickness and is, as best shown in FIG. 3B, is of a generally U-shaped cross-section having a groove opening upwardly with the main shaft 5 extending within the groove. Each of the guide rail 20 and the slide body 3 is preferably made of ceramics which may be selected from the group consisting of silicon carbide (SiC), aluminum oxide ($Al_2O_3$), zirconium oxide ($ZrO_2$) and silicon nitride ($Si_3N_4$).

The externally pressurized linear bearing assembly 2 is built in the slide body 3 so as to form a minute bearing gap d between the guide rail 20 and the slide body 3 and is operable to support the slide body 3 in a non-contact fashion by the effect of a static pressure developed in the bearing gap d by jetting a compressed air into the bearing gap d through a multiplicity of nozzles 43 that are formed in the top and side plates 3a and 3b of the slide body 3. All of the noozzles 43 are communicated with a common air supply passage means 44 defined in the slide body 3. As shown in FIG. 3A, the common air supply passage means 44 is in turn communicated by means of a flexible tube or the like with a source of compressed air (not shown) through a supply port 45 defined at one location of the slide body 3.

Figure 3C:
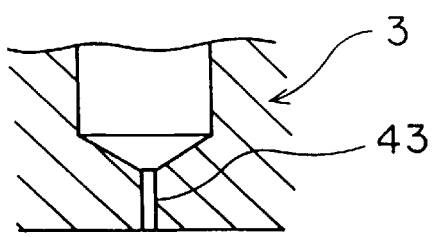
FIG. 3C is a fragmentary side sectional view, on an enlarged scale, showing a nozzle employed in the slide body.

The air supply passage means 44 includes, as best shown in FIGS. 3A and 3B, left and right main passages 44a extending in a direction parallel to the direction of movement of the slide body 3 between the advanced and retracted positions, a plurality of parallel branch passages 44b branched off from each of the left and right main passages 44a, upright passages 44c defamed in each of the side plates 3b in communication with and extending transverse to the respective branch passages 44b. Each of the left and right main passages 44a includes the noozzles 43 communicated with respective portions of the associated main passage 44a and, similarly, each of the upright passages 44c includes the corresponding nozzle 43 communicated therewith. Each of those passages 44a to 44c is formed by drilling straight in the top and side walls 3a and 3b with the left and right main passages 44a communicated at one end with each other through an external conduit 46 positioned outside the slide body 3. Open ends of the respective left and right main passages 44a remote from the external conduit 46 and open ends of the branch passages 44b remote from the associated main passages 44a are all closed by an insert plug 47. Each of the noozzles 43 is, as shown in FIG. 3C, in the form of a constricted orifice.

The externally pressurized linear bearing assembly employed in the illustrated embodiment makes use of a means for regulating flotation of the slide body 3. This flotation regulating means comprises a magnet bar 41 disposed in a lower end portion of each of the side plates 3b of the slide body 3, and elongated magnetizable member 42 disposed on and along each of the opposite sides of the guide rail 20 so that a magnetic force of attraction can develop between the respective magnet bar 41 and the associated magnetizable member 42. The magnetizable member 42 on each side of the guide rail 20 is of a generally L-shaped cross-section including vertical and horizontal segments 42a and 42b and is so disposed and so positioned with the horizontal segment 42b of each magnetizable member 42 fitted firmly in a corresponding cutout 20a formed in each lower outside edge portion of the guide rail 20.

As shown in FIG. 1A, the main shaft 5 is driven by a drive motor 7 by means of a reduction gear unit 6. The frictional reciprocating drive mechanism 4 is operable to translate a rotary motion of the main shaft 5, so driven by the drive motor 7, into a linear movement, performed by the slide body 3, through a plurality of, for example, three, rollers 9 carried by the slide body 3. The drive motor 7 is controlled by a control means (not shown) through a closed loop circuit including a measuring instrument 10 for detecting the distance of movement of the slide body 3 between the advanced and retracted positions. The drive motor 7 employed in the illustrated embodiment is in the form of an AC servo-motor.

The three rollers 9 forming respective components of the frictional reciprocating drive mechanism 4 are disposed around the main shaft 5 and are supported by the slide body 3 in a manner which will now be described with particular reference to FIGS. 2A and 2B. Each of the rollers 9 is rotatably mounted on a roller spindle 11 through a circumferential row of a multiplicity of rolling elements 12 intervening between it and the roller spindle 11. In the illustrated embodiment, each of the rollers 9 is rotatably mounted around the roller spindle 11 through a pair of axially spaced rolling contact bearings 13 such as, for example, angular ball bearings including the rolling elements 12. The roller spindle 11 for each of the rollers 9 has its opposite ends protruding axially outwardly from the respective roller 9. The rolling contact bearings 13 have their inner races fixed to the roller spindle 11 by firmly clamping the inner races between a radially outwardly enlarged portion of the roller spindle 11 and an nut member 19 fastened on the roller spindle 11.

The axially outwardly protruding opposite ends of the roller spindle 11 for each roller 9 are formed into globes 11a, and the roller spindle 11 is axially sandwiched between a fixed support 14 and a generally plate-like pressing member 15, which forms a component of a pressure applying means 15A, with the respective globes 11a held in contact therewith. The fixed support 14 is secured to the top plate 3a of the slide body 3. On the other hand, in addition to the plate-like pressing member 15, the pressure applying means 15A includes a pressing member carrier 16 secured to the top plate 3a of the slide body 3 on one side of the respective roller 9 opposite to the fixed support 14, and a resilient member 17 which may be a pressure applying spring such as, for example, a compression coil spring. The pressing member 15 is supported by the pressing member carrier 16 through the resilient member 17 for displacement in respective directions axially and radially of the main shaft 5.

Respective surfaces of the fixed support 14 and the pressing member 15, which face towards each other, have retainer plates 18A and 18B rigidly secured thereto, which plates 18A and 18B form respective component parts of a roller spindle retaining means 18. As best shown in FIG. 2B, each of the retainer plates 18A and 18B is in the form of a generally triangular frame structure having a triangular opening defamed therein. Respective apex portions of the triangular opening in each retainer plate 18A and 18B are used to receive therein the corresponding globes 11a of the associated roller spindles 11 to thereby retain the roller spindles 11 in position relative to the main shaft 5.

Figure 2A:
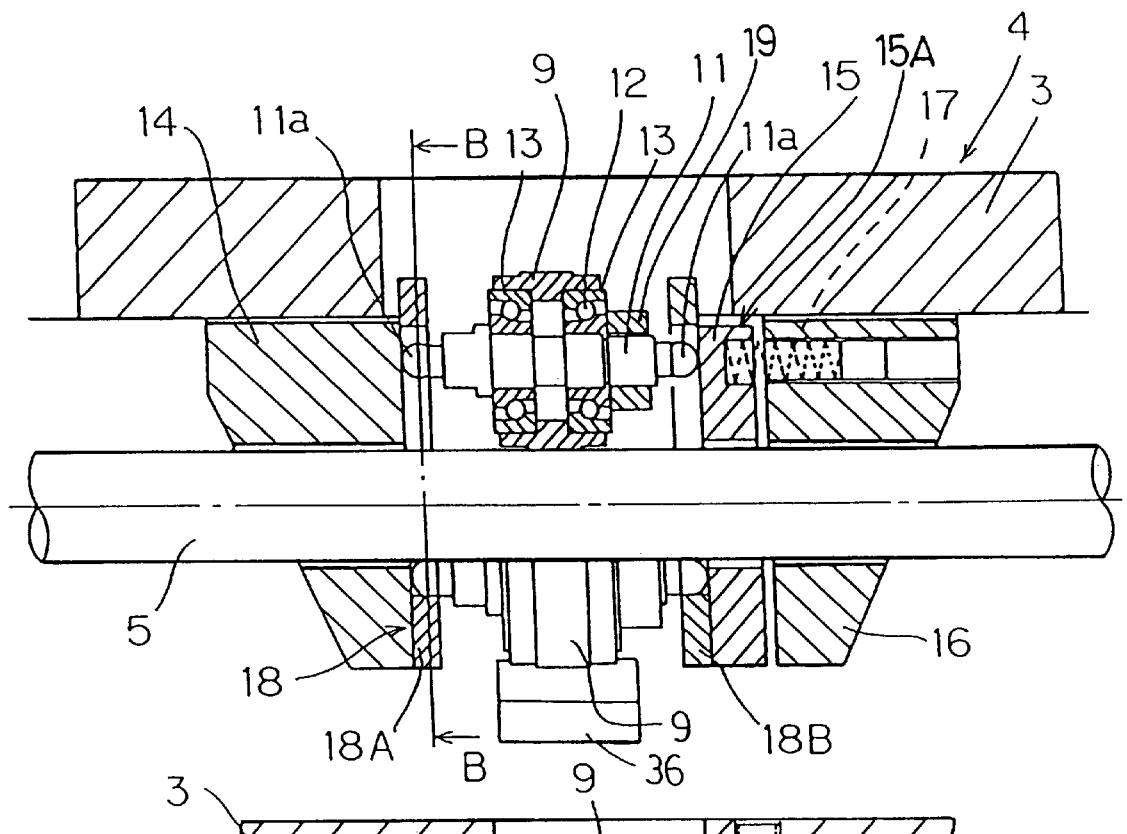
FIG. 2A is a fragmentary side sectional view, with a portion cut out, showing a frictional reciprocating drive mechanism employed in the positioning apparatus according to the embodiment of the present invention.
Figure 2B:
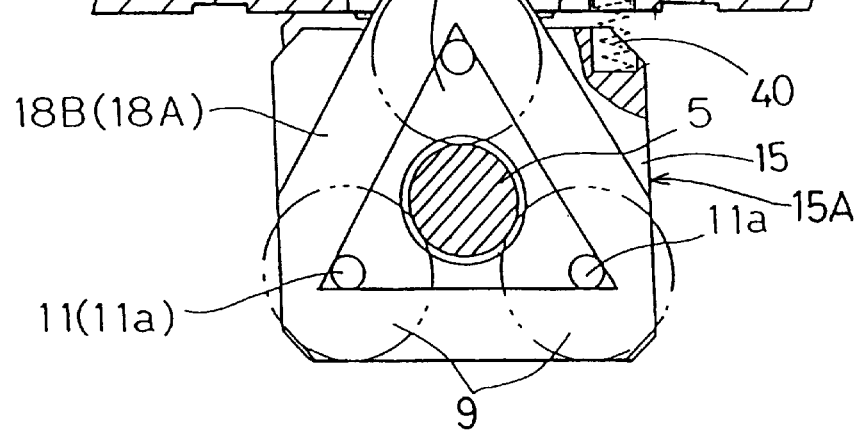
FIG. 2B is a cross-sectional view taken along the line B—B in FIG. 2A.

Also as shown in FIG. 2B, a resilient member 40 such as, for example, a spring element is interposed between the slide body 3 and the retainer plate 18B with respective opposite ends thereof received in bearing recesses defamed in the slide body 3 and the retainer plate 18B. This resilient member 40 applies a biasing force to one corner area of the pressing member 15 to urge the pressing member 15 to rotate together with the adjacent retainer plate 18B, connected therewith, in one direction, for example, clockwise as viewed therein about the main shaft 5. In other words, by the action of the resilient member 40, the retainer plates 18A and 18B are skewed relative to each other in respective directions opposite to each other about the main shaft 5. For this reason, each of the roller spindles 11 retained by the paired retainer plates 18A and 18B in the manner described above are so supported as to extend at a slight angle relative to the longitudinal axis of the main shaft S. Thus, the pressing member 15 and the resilient members 17 and 40 altogether constitute the pressure applying means 15A referred to hereinbefore.

It is to be noted that each of the rollers 9 is of a design having a cylindrical outer peripheral surface stepped to have a large diameter portion and a reduced diameter portion on each side of the large diameter portion in a direction axially of the corresponding roller spindle 11 as clearly shown in FIG. 2A. Alternatively, each of the rollers 9 may be of a design having its outer peripheral surface of semicircle in sectional shape.

Referring particularly to FIGS. 1A and 1D, the reduction gear unit 6 includes a plurality of stages of wheels, for example, first and second friction wheels 21 and 22 and a pressure applying mechanism 33. The drive motor 7 is carried by a first rocking plate 24 mounted on the machine bench 1 for rocking motion about a support pin 27. This drive motor 7 is coupled with a first drive-side shaft 26 rotatably supported at its opposite ends by respective bearing units 25A and 25B mounted on such rocking plate 24. The first friction wheel 21 held in contact with the drive-side shaft 26 is fixed to a second drive-side shaft 30 supported by a second rocking plate 28 through spaced bearing units 29A and 29B. The second rocking plate 28 is mounted on the machine bench 1 for rocking motion about a support pin 31. On the other hand, the second friction wheel 22 is fixedly mounted on a friction wheel mount 5a which is a part of, or a coaxial extension of, the main shaft 5 and which is rotatably supported by spaced bearing units 32A and 32B both mounted on the machine bench 1.

Each of the first and second rocking plates 24 and 28 undergoes the rocking motion about the respective support pin 27 or 31 in a direction close towards and away from the main shaft 5, and each of the first and second drive-side shafts 26 and 30 has its longitudinal axis lying in the same plane as that in which the longitudinal axis of the main shaft 5 lies. The first rocking plate 24 is normally urged towards the first friction wheel 21 by means of the pressure applying mechanism 33 which includes a spring support member 33a fixedly mounted on the machine bench 1 and a resilient member such as a pressing spring 33b. It is to be noted that each of the bearing units 25A and 32A may be equally employed in the form of an individual reduction gear unit comprising a reduction gear mechanism housed within a casing.

The machine bench 1 is provided with a solid lubricant 35 so positioned on the machine bench 1 as to contact each of the first and second friction wheels 21 and 22 as shown in FIG. 1D and, similarly, a solid lubricant 36 is carried by the slide body 3 so as to contact each of the rollers 9 as shown in FIG. 2A.

The positioning apparatus of the structure described hereinabove operates in the following manner. The rotational drive of the drive motor 7 is transmitted to the main shaft 5 at a reduced speed through the first and second frictional wheels 21 and 22 of the reduction gear unit 6. As the main shaft 5 rotates, each of the rollers 9 held in contact with the main shaft 5 rotates about the associated roller spindle 11 in a direction substantially counter to the direction of rotation of the main shaft 5 while oriented at a lead angle that is equal to the angle of inclination of the respective roller 9, accompanied by a frictional force developed between the respective roller 9 and the main shaft 5. By those forces of friction between the rollers 9 and the main shaft 5, the slide body 3 carrying the rollers 9 in the manner hereinbefore described is driven axially of the main shaft 5 towards either the advanced position or the retracted position.

The positioning apparatus so designed according to the present invention can being about the following functions and effects.

(1) Since the slide body 3 which serves as a table is mechanically supported on the main shaft 5 through the rollers 9 contacting the main shaft 5 with respect to the direction of movement thereof between the advanced and retracted positions, the positioning apparatus of the present invention will not be adversely affected by an external disturbance as compared with a completely non-contact system.

(2) Since the pressing member 15 has a freedom of movement or deflection in a direction vertical to the axial direction, any possible misalignment between the externally pressurized linear bearing assembly 2 and the main shaft 5 can be absorbed. For this reason, the straightness depends on the precision of the externally pressurized linear bearing assembly 2 which provides a guide and accordingly, the straightness of the path of movement of the slide body 3 can be increased.

(3) Since the main shaft of the frictional reciprocating drive mechanism is positioned substantially intermediate of the width of the externally pressurized linear bearing assembly 2 to drive a portion of the slide body 3 substantially intermediate of the width thereof, a possible causes of reduction in accuracy such as, for example, a yawing can advantageously be minimized.

(4) Since the reduction gear unit 6 is employed, an adverse influence which would be brought about by a fluctuation in rotation of the drive motor 7 can advantageously be minimized.

(5) Since the solid lubricants 35 and 36 are employed and held in contact with the friction wheels 21 and 22 and the rollers 9, a predetermined quantity of lubricant can be supplied to respective friction areas to accomplish a stabilized rotation.

(6) Since the reduction gear unit 6 is displaceable in pursuit of the rocking motion of the drive-side shafts 26 and 30 while being pressed by the pressure applying mechanism 33, any possible error of the friction wheels 21 and 22 in a radial direction can be absorbed to secure an assured contact between the friction wheels 21 and 22 and the drive-side shafts 26 and 30, respectively to thereby accomplish an assuredly stabilized transmission of the rotational force.

(7) Since the roller spindle 11 of each of the rollers 9 held in contact with the main shaft 5 has its opposite ends shaped spherically, the previously described misalignment can be absorbed smoothly. Also, Since the retainer plates 18A and 18B each in the form of a frame structure are employed, the two retainer plates 18A and 18B can be simultaneously machined to secure a machining accuracy to such an extent that an angular error among the rollers 9 can be minimized.

(8) Since each of the rollers 9 is rotatably supported by the roller spindle 11 through the circumferential row of the rolling elements 12, the torque of a load on the main shaft 5 is small.

(9) Since the guide rail 20 and the slide body 3 are made of ceramics, not only can the rigidity be increased, but also an accurate positioning with high precision is possible.

(10) Since the magnets 41 are employed, the slide body 3 can be supported more stable by the external pressure.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in the foregoing embodiment of the present invention, each of the rollers employed in the frictional reciprocating drive mechanism may be an outer race of a rolling contact bearing. Alternatively, a single roller of a type wherein, for example, opposite ends of the single roller are formed with respective ball engagement holes of a substantially conical shape may be employed, in which case the single roller may be supported rotatably by means of balls engageable in the respective ball engagement holes.

Accordingly, such changes and modifications are, unless they depart from the scope of the present invention as delivered from the claims annexed hereto, to be construed as included therein.

What is claimed is:

1. A positioning apparatus which comprises:

a slide body mounted on a machine bench for reciprocating movement between advanced and retracted positions; and a frictional reciprocating drive mechanism provided in the slide body for reciprocately driving the slide body, said frictional reciprocating drive mechanism comprising a main shaft and a plurality of rollers disposed around the main shaft and held in a rolling contact with an outer periphery of the main shaft, each of said rollers being inclined at a predetermined angle relative to the main shaft, and a pressure applying means for applying a pressure to each of the rollers relative to the main shaft;

wherein said pressure applying means comprises a pressing member and a resilient member, each of said rollers being rotatably mounted on an outer periphery of a roller spindle through a circumferential row of rolling elements, said roller spindle for each roller being sandwiched from an axial direction between a fixed support and said pressing member both provided on the slide body, said fixed support and said pressing member including a spindle retaining means for regulating positions of opposite ends of the respective roller with respect to the axial direction, said pressing member being displaceable relative to said slide body indirections axially of and transverse to the main shaft;

wherein the roller spindle for each of the rollers has its opposite ends shaped spherically and wherein said spindle retaining means comprises a pair of retaining plates disposed in the vicinity of the fixed support and the pressing member, respectively, each of said retaining plates being operable to regulate the roller spindles of the plural rollers at respective inner peripheral corner areas thereof.

2. A positioning apparatus as claimed in claim 1 for use in an optical disc mastering machine, which comprises a frictional reciprocating drive mechanism for supporting a table formed by the slide body relative to a machine bench by an external pressure and for slidingly driving the table relative to the machine bench.

3. A positioning apparatus in combination with an optical disc mastering machine which is provided with the positioning apparatus as defined in claim 1.

4. The positioning apparatus as claimed in claim 1, further comprising a solid lubricant held in contact with an outer peripheral face of a friction wheel which drives said main shaft.

5. The positioning apparatus as claimed in claim 1, further comprising a rail mounted on the machine bench for guiding the slide body and wherein said rail and said slide body are made of ceramics.

6. The positioning apparatus as claimed in claim 1, further comprising a magnet means mounted on the slide body, said magnet means being operable to magnetically attract the slide body and the machine bench towards each other.

7. The positioning apparatus as claimed in claim 1, wherein said pressure applying means applies a pressure to each of the rollers relative to the main shaft to support between the slide body and the machine bench by an external pressure.

8. A frictional reciprocating drive mechanism which comprises:

a main shaft;

a plurality of rollers held in a rolling contact with an outer periphery of the main shaft and inclined at a predetermined angle relative to the main shaft;

a slide body movable together with the rollers that are moved as a result of rotation of the main shaft;

a source of rotation for rotating the main shaft;

a reduction gear unit for transmitting the rotation of the source of rotation from a drive-side shaft to a friction wheel to thereby transmit the rotation of the source of rotation at a reduced speed to the main shaft;

a displacement permitting support means for displaceably supporting the drive-side shaft so as to displace in a direction towards and away from the friction wheel; and a pressure applying means for resiliently urging the drive-side shaft towards the friction wheel;

wherein said pressure applying means comprises a pressing member and a resilient member, said rollers being rotatably mounted on an outer of a respective roller spindle through a circumferential row of rolling elements, said roller spindles being sandwiched from an axial direction between a fixed support and a pressing member both provided on the slide body, said fixed support and said pressing member including a spindle retaining means for regulating positions of opposite ends of the roller spindles with respect to the axial direction, said pressing member being displaceable relative to the slide body in directions axially of and transverse to the main shaft; and wherein each of the roller spindles for each of the rollers has its opposite ends shaped spherically and wherein said spindle retaining means comprises a pair of retaining plates disposed in the vicinity of the fixed support and the pressing member, respectively, each of said retaining plates being operable to regulate the roller spindles of the plural rollers at respective inner peripheral corner areas thereof.

9. A frictional reciprocating drive mechanism which comprises:

a main shaft;

a plurality of roller held in a rolling contact with an outer periphery of the main shaft and inclined at a predetermined angle relative to the main shaft;

a slide body movable together with the rollers that are moved as a result of rotation of the main shaft;

a source of rotation for rotating the main shaft;

a reduction gear unit for transmitting the rotation of the source of rotation from a drive-side shaft to a friction wheel to thereby transmit the rotation of the source of rotation at a reduced speed to the main shaft; and a solid lubricant held in contact with an outer peripheral face of the friction wheel;

wherein said rollers being rotatably mounted on an outer periphery of a respective roller spindle through a circumferential row of rolling elements, said spindles roller spindles being sandwiched from an axial direction between a fixed support and a pressing member both provided on the slide body, said fixed support and said pressing member including a spindles retaining means for regulating positions of opposite ends of the roller spindles with respect to the axial direction, said pressing member being displaceable relative to the slide boby in directions axially of and transverse to the main shaft; and wherein each of the roller spindles for each of the rollers has its opposite ends shaped spherically and wherein said spindle retaining means comprises a pair of retaining plates disposed in the vicinity of the fixed support and the pressing member, respectively, each of said retaining plates being operable to regulate the roller spindles of the plural rollers at respective inner peripheral corner areas thereof.

* * * * *